(12) United States Patent
Yomogisawa (10) Patent No.: US 8,482,777 B2
(45) Date of Patent: Jul. 9, 2013

(54) IMAGE INFORMATION PROCESSING DEVICE INCLUDING COMPARING UNIT FOR PRINTING PROCESSING SYSTEM, COMPUTER-READABLE MEDIUM AND IMAGE INFORMATION PROCESSING METHOD FOR THE SAME

(75) Inventor: Mitsuhisa Yomogisawa, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 285 days.

(21) Appl. No.: 12/884,633

(22) Filed: Sep. 17, 2010

(65) Prior Publication Data

US 2011/0181908 A1 Jul. 28, 2011

(30) Foreign Application Priority Data

Jan. 26, 2010 (JP) ................................. 2010-014316

(51) Int. Cl.
*G06F 3/12* (2006.01)
(52) U.S. Cl.
USPC ....................................................... 358/1.15
(58) Field of Classification Search
None
See application file for complete search history.

(56) References Cited

U.S. PATENT DOCUMENTS

| 5,207,517 A * | 5/1993 | Ito ................................. 358/1.8 |
| 5,383,730 A * | 1/1995 | Takahashi ....................... 400/76 |
| 2002/0167678 A1 | 11/2002 | Shiraishi |

FOREIGN PATENT DOCUMENTS

| JP | 05-077489 | 3/1993 |
| JP | 2002-335398 | 11/2002 |

* cited by examiner

*Primary Examiner* — Jeremiah Bryar
(74) *Attorney, Agent, or Firm* — Fildes & Outland, P.C.

(57) ABSTRACT

In an image information processing device, in order to execute printing with a printing apparatus that applies as a basic form any printing form of plural differing printing forms to print an image, a receiving unit receives image information and instruction information including printing form information and scale information for printing based on the image information. An extracting unit extracts an object whose printing form is to be changed in code image units on the basis of scale designation information. A comparing unit compares a dot pattern that is expanded on the basis of printing form designation information and a dot pattern that is expanded on the basis of the basic form. A determining unit determines, on the basis of the comparison result, whether or not to maintain a designated printing form based on the printing form designation information with respect to the extracted object.

19 Claims, 8 Drawing Sheets

| PRINTING APPARATUS TYPE | | FONT TYPE | PRINTED RESULT | |
|---|---|---|---|---|
| | | | STANDARD SIZE | ENLARGED SIZE |
| PRINTING APPARATUS 12(1) | | BITMAP FONT | 「拳」「漠」「秤」「蟹」「梅」「戴」 | 大 |
| PRINTING APPARATUS 12(2) | (a) | OUTLINE FONT (BASIC FONT TYPE) | 「拳」「漠」「秤」「蟹」「梅」「戴」 | 大 |
| | (b) | BITMAP FONT (BACKUP FONT TYPE) | 「拳」「漠」「秤」「蟹」「梅」「戴」 | 大 |

COMPATIBLE / NOT COMPATIBLE

IMAGE INFORMATION PROCESSING DEVICE INCLUDING COMPARING UNIT FOR PRINTING PROCESSING SYSTEM, COMPUTER-READABLE MEDIUM AND IMAGE INFORMATION PROCESSING METHOD FOR THE SAME

CROSS-REFERENCE TO RELATED APPLICATION

This application is based on and claims priority under 35 USC 119 from Japanese Patent Application No. 2010-014316 filed Jan. 26, 2010.

BACKGROUND

1. Technical Field

The present invention relates to an image information processing device, a computer-readable medium that stores an image information processing program and an image information processing method.

2. Related Art

In printing systems and the like particularly in enterprise printing, printing information of printing matter of those printing systems is described by printing language such as page description language. For example, printing systems and the like interpret the printing language form, generate bitmap font data, and perform printing on the basis of the bitmap font data. Usually, as fonts, there are bitmap fonts and outline fonts. Relatively speaking, oftentimes the image quality of bitmap fonts is inferior to the image quality of outline fonts. Superiority or inferiority in image quality may occur also in differences in resolution. Hereinafter, whether or not there are differences in image quality will sometimes be expressed as whether or not there is compatibility.

SUMMARY

According to an aspect of the invention, there is provided an image information processing device including: a receiving unit that receives image information and instruction information including printing form information and scale information for printing on the basis of the image information in order to execute printing with a printing apparatus that is capable of applying at least plural differing printing forms and applies as a basic form any printing form of the plural differing printing forms to print an image; a processing unit that executes processing that is necessary in order to print on the basis of the instruction information that is received by the receiving unit; a sending unit that sends to the printing apparatus printing information after the execution of the processing by the processing unit; an information acquiring unit that acquires printing form designation information and scale designation information that are instructed by the instruction information at the time of the processing in the processing unit; an extracting unit that extracts, on the basis of the scale designation information that is acquired by the information acquiring unit, an object whose printing form is to be changed in code image units registered on the basis of identification codes beforehand; a comparing unit that compares, with respect to the object that is extracted by the extracting unit, a dot pattern that is expanded on the basis of the printing form designation information that is acquired by the information acquiring unit and a dot pattern that is expanded on the basis of the basic form; and a determining unit that determines, on the basis of the result of comparison by the comparing unit, whether or not to maintain a designated printing form based on the printing form designation information with respect to the extracted object.

BRIEF DESCRIPTION OF THE DRAWINGS

An exemplary embodiment of the present invention will be described in detail based on the following figures, wherein.

DETAILED DESCRIPTION

Figure 1:
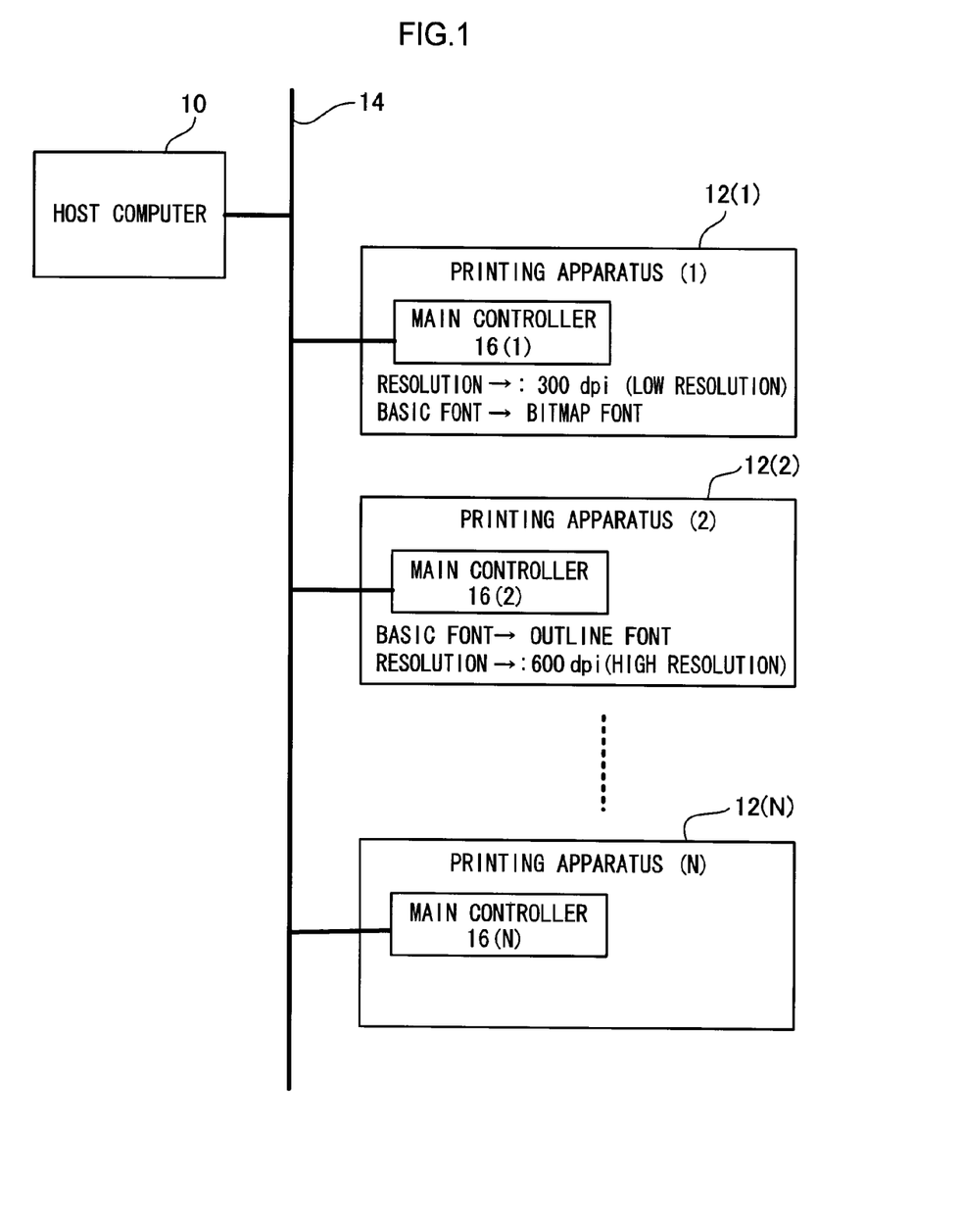
FIG. 1 is a general configuration diagram of a printing processing system pertaining to the exemplary embodiment.

In FIG. 1, there is shown the general configuration of a printing processing system pertaining to an exemplary embodiment of the present invention.

The printing processing system has a host computer 10 and plural printing apparatus 12(1) to 12(N) (where N is a positive integer) that are interconnected via a communication network 14. The printing apparatus 12(1) to 12(N) will be called "the printing apparatus 12" when they are collectively referred to without being distinguished between.

A printing job is outputted from the host computer 10. The printing job has image information and management information that designates the printing form in which this image information is to be printed and processed. The management information includes font type, resolution, and font size, and scale information, which serve as printing form information. When outputting this printing job, the host computer 10 designates the printing apparatus 12.

Sometimes the respective printing apparatus 12 have differing specifications. For example, in the printing apparatus 12(1), the basic font type serving as the printing form is a bitmap font, and in the printing apparatus 12(2), the basic font type serving as the printing form is an outline font. In the printing apparatus 12(1), the printing resolution serving as the printing form is a relatively low resolution, and in the printing apparatus 12(2), the printing resolution serving as the printing form is a relatively high resolution. In the printing apparatus 12(1), the basic font size serving as the printing form is 12×12 dots, and in the printing apparatus 12(2), the basic font size serving as the printing form is 18×18 dots. Below, in the present exemplary embodiment, description will be given using the printing apparatus 12(1) and the printing apparatus 12(2) as targets and assuming that the basic fonts serving as the printing form differ between the printing apparatus 12(1) and the printing apparatus 12(2).

On a time-series basis, oftentimes the printing apparatus 12(1) whose basic font type is a bitmap font is an old type of printing apparatus and the printing apparatus 12(2) whose basic font type is an outline font is a new type of printing apparatus.

The printing job in which the printing apparatus 12 has been designated and which is sent from the host computer 10 is sent to a main controller 16 disposed in the designated printing apparatus 12, and the main controller 16 executes printing information format processing and the like on the basis of the management information included in the printing job.

Sometimes the font type is designated in the management information. In the printing apparatus 12, printing is executed on the basis of the basic font type that is set beforehand. If the font type is designated, oftentimes that designated font type is the basic font type of the aforementioned old type of printing apparatus (the printing apparatus 12(1)) and is intended to maintain the result of printing by this old type of printing apparatus.

Figure 2:
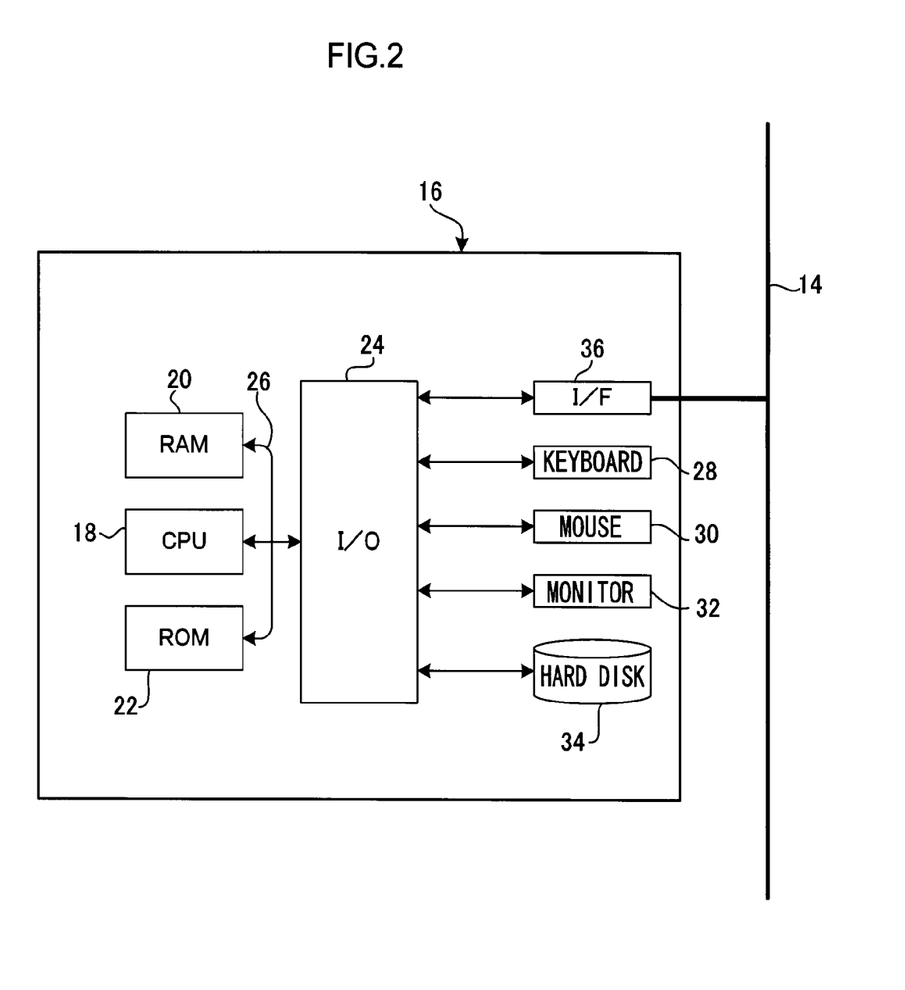
FIG. 2 is a block diagram showing the hardware configuration of a main controller installed in printing apparatus.

As shown in FIG. 2, the main controller 16 installed in the printing apparatus 12 has a CPU 18, a RAM 20, a ROM 22, an input/output (I/O) 24, and a bus 26 such as a data bus or a control bus that interconnects these.

A keyboard 28, a mouse 30, and a monitor 32 are respectively connected to the I/O 24. A hard disk (HDD) 34 that is a large-capacity storing medium whose storage capacity is at least larger than that of the RAM 20 is connected to this I/O 24, and the hard disk 34 may store plural printing jobs. The I/O 24 is connected to the communication network 14 via an interface (I/F) 36.

In the printing apparatus 12 that has been designated by the printing job that is transmitted from the host computer 10, the usual processing is to execute printing by the basic font type as mentioned above. In this case, if the printing is printing where there is no scale designation, even if the basic font type differs from the designated font type included in the management information of the printing job, there are no visible differences in the results of printing by the basic font type and the designated font type. It is judged that the printing results are "compatible".

If the printing apparatus 12 execute printing in a state where there is a scale (enlargement) designation in the printing job and the number of dots has increased in accordance with the scale designation, visible differences occur in the results of printing by the basic font type and the designated font type. It is judged that the printing results are "not compatible".

Whether or not the printing results are compatible will be described in detail in FIG. 3.

Figure 3:
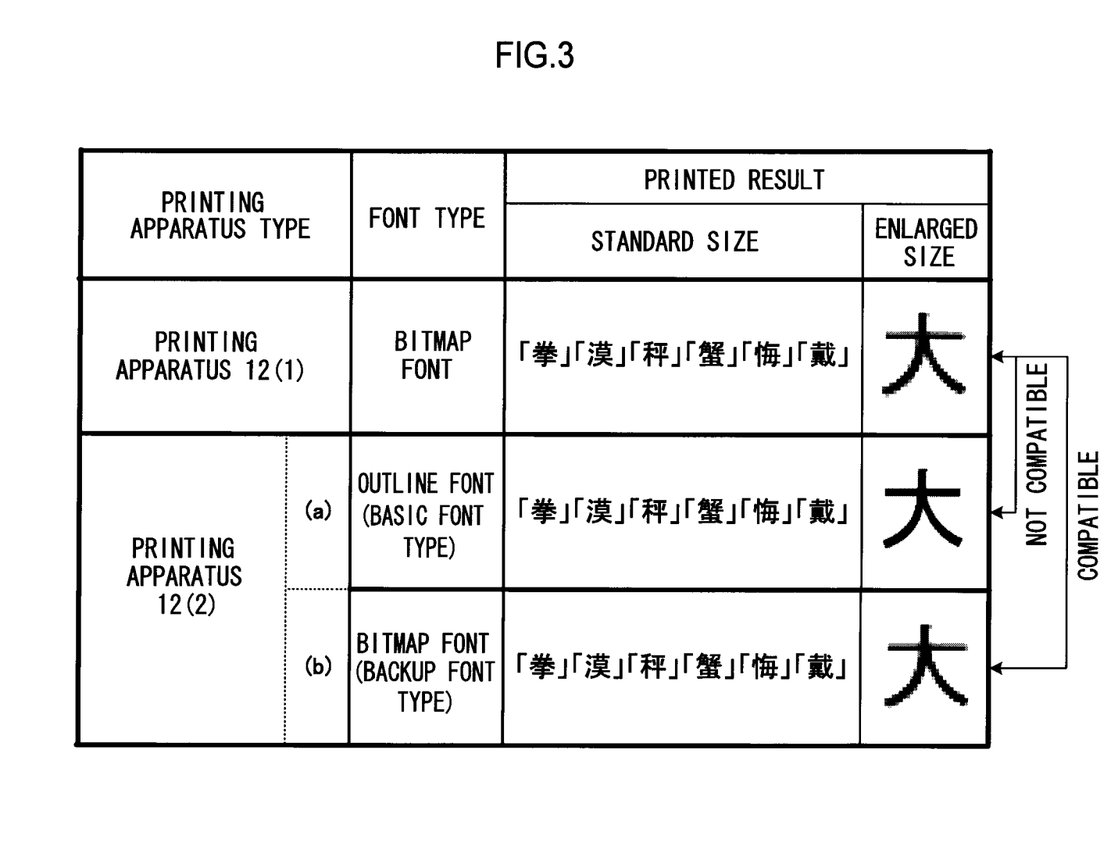
FIG. 3 is a comparison diagram showing printed states resulting from differences in font types and the like of the printing apparatus.

In FIG. 3, the printing result of the printing apparatus 12(1) whose basic font type is a bitmap font and the printing result of the printing apparatus 12(2) whose basic font type is an outline font (see (a) of the printing apparatus 12(2)) will be compared. If there is no scale designation (in the case of standard size), there is no difference between the printed state using a bitmap font in the printing apparatus 12(1) and the printed state using an outline font in the printing apparatus 12(2) ((a) of the printing apparatus 12(2)).

In contrast, if there is an enlarge designation, there is a difference between the printed state using a bitmap font in the printing apparatus 12(1) and the printed state using an outline font in the printing apparatus 12(2) ((a) of the printing apparatus 12(2)). That is, referring to the enlarged size characters, whereas in the bitmap font character, the sloping lines have steps, in the outline font character, the sloping lines slope smoothly. In FIG. 3, this is described using Japanese characters, but even with alphabetical letters, numbers, symbols and etc., if there is an enlarge designation, a difference arises in the similar manner between the printed state used a bitmap font in the printing apparatus 12(1) and the printed state using an outline font in the printing apparatus 12(2).

In the present exemplary embodiment, if the printing job includes a font type designation and a scale designation, the states of the dots that are expanded are compared, in symbol units expressed in single fonts (usually, character code units), between a dot pattern that has been expanded by the basic font type and a dot pattern that has been expanded by the designated font type that has been designated in order to obtain a target printing result. The character code units correspond to code image units registered on the basis of identification codes.

Figure 4:
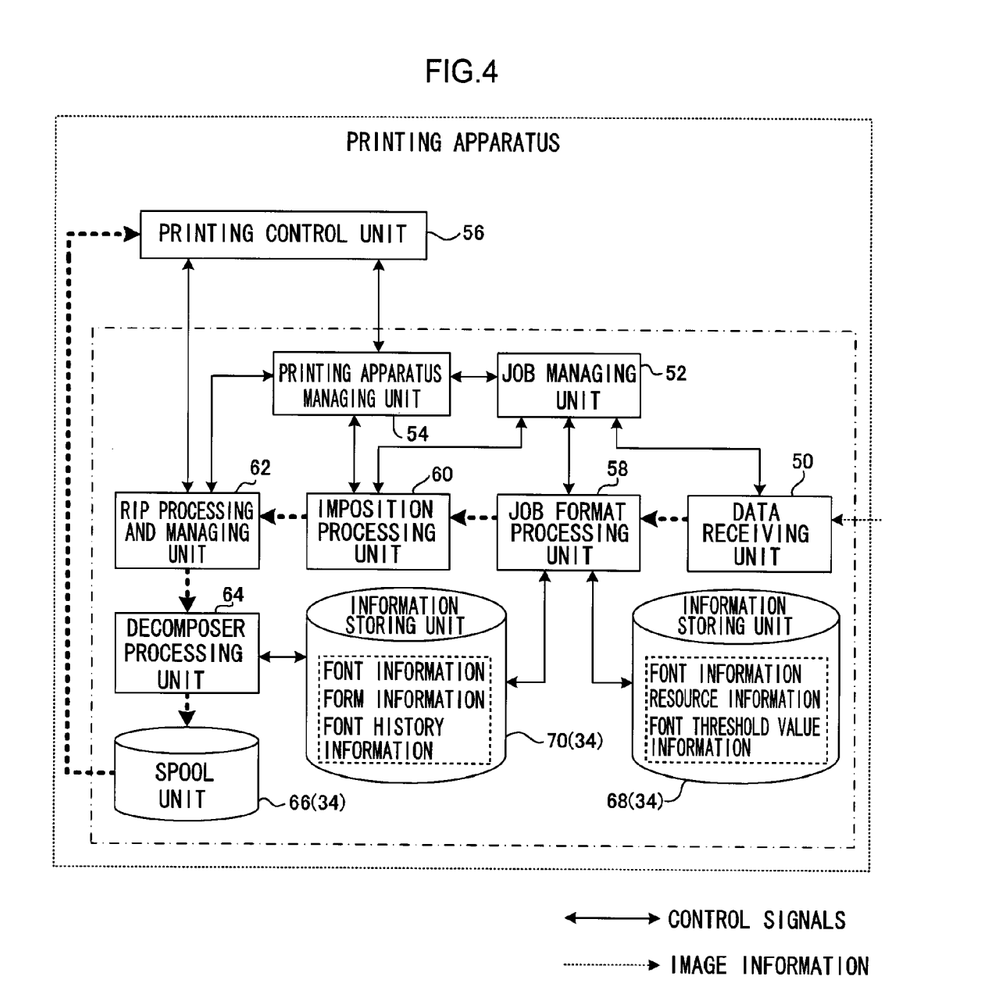
FIG. 4 is a block diagram for executing printing processing in the main controller pertaining to the exemplary embodiment.

FIG. 4 shows a functional block diagram for image information processing control based on font adjustment control in the main controller 16 of the printing apparatus 12. This functional block diagram is not intended to limit the hardware configuration of the main controller 16. The functional blocks may also have another hardware configuration, may also be configured by software, and may also be configured by hardware and software.

The printing job outputted from the host computer 10 is inputted to a data receiving unit 50. The data receiving unit 50 is connected to a job managing unit 52. The printing job that has been received by the data receiving unit 50 is analyzed and separated into the image information and the management information with respect to the image information by this job managing unit 52.

The job managing unit 52 is connected to a printing apparatus managing unit 54. The printing apparatus managing unit 54 manages image forming unit specification information (status, information, etc.) received from a printing control unit 56 that controls the operation of the image forming unit, and the printing apparatus managing unit 54 sends this specification information to the job managing unit 52.

The job managing unit 52 is also connected to a job format processing unit 58 and an imposition processing unit 60.

The job managing unit 52 executes printing job scheduling, holding, hold cancellation, and deletion processing. The job managing unit 52 deploys a filter corresponding to the data format of the printing job to the job format processing unit 58 and the imposition processing unit 60.

The job managing unit 52 controls the data receiving unit 50, the job format processing unit 58, and the imposition processing unit 60 and processes the image information of the printing job that has been received by the data receiving unit 50.

The printing apparatus managing unit 54 is connected to the imposition processing unit 60 and a RIP processing and managing unit 62 and manages the image information that is sent from the job format processing unit 58.

The image information on which processing by the RIP processing and managing unit 62 has been executed is stored, via a decomposer processing unit 64, in a spool unit 66 that is a partial region of the hard disk 34 (see FIG. 2) of the main controller 16. The image information that has been stored in the spool unit 66 is sent in response to a request from the printing control unit 56.

The storage region of the hard disk 34 (see FIG. 2) of the main controller 16 is equipped with the spool unit 66 and also two types of information storing units 68 and 70. The information storing unit 68 stores font information, resource information, and font threshold value information and is connected to the job format processing unit 58. The information storing unit 70 stores font information, form information, and font history information and is connected to the job format processing unit 58 and the decomposer processing unit 64.

The job format processing unit 58 executes format processing of the image information on the basis of the filter that has been designated from the job managing unit 52.

The job format processing unit 58 acquires the font information, the resource information, and the like from the information storing unit 68 and executes filter processing.

The job format processing unit 58 performs font suitability determination processing between the basic font type of the printing apparatus 12 and the designated font type included in the management information of the printing job on the basis of the management information of the printing job. That is, for example, if the basic font type is an outline font and the designated font type is a bitmap font and if the scale information included in the management information designates an enlargement equal to or greater than a given scale, the job format processing unit 58 performs font type suitability determination processing (a steady determination processing mode). Here, the determination processing is performed if an enlargement has been designated, but the determination processing may also be performed if a reduction has been designated.

The job format processing unit 58 determines whether or not it is necessary to execute font type suitability determination processing on the basis of the font type information and the scale information that have been designated. If the job format processing unit 58 determines that execution is necessary, it acquires the image information and executes dot pattern expansion in the basic font type of the printing apparatus 12 and dot pattern expansion in the designated font type of the printing job.

Here, dot patterns resulting from the respective font types are expanded using an outline font for the basic font type that has been set as the basis for printing in the printing apparatus and using a bitmap font for the designated font type that has been designated in order to obtain the target printing result.

The job format processing unit 58 calculates a difference between the fonts in predetermined units with respect to the dot patterns that have been expanded.

That is, the dots are signals of either value of a binary signal (white pattern/black pattern). A difference per dot occurs between the dot patterns resulting from the expansion. Thus, the job format processing unit 58 calculates the degree of congruency as a comparison target using 100% for complete congruency between the dot patterns.

In the present exemplary embodiment, the job format processing unit 58 calculates the degree of congruency in dot units and also the degree of congruency in 1-byte delimiting units (hereinafter called "byte units") and the degree of congruency in 2-byte delimiting units (hereinafter called "word units").

A comparison with a threshold value is executed with respect to this calculation result. The comparison processing is as follows.

When the font size is 48×48 dots, 2,304 (=48×48) dots are compared in dot units, 288 (=48×(6 bytes/1 line)) bytes are compared in byte units, and 144 (=48×(3 words/1 line) words are compared in word units.

A threshold value per font type (a threshold value for outline fonts and a threshold value for bitmap fonts) is set beforehand for the dot units, the byte units, and the word units.

Here, if the basic font type is an outline font, if the comparison result in all of the dot units, the byte units, and the word units is within the range of the outline font-use threshold value (equal to or less than the threshold value) of the corresponding unit, the job format processing unit 58 judges to maintain the outline font that is the basic font type and execute printing.

If the comparison result in any of the units is outside the range of the threshold value (exceeds the threshold value) of the corresponding unit, the job format processing unit 58 may also judge to switch to a bitmap font. However, in the present exemplary embodiment, the job format processing unit 58 executes a confirmation processing mode after the steady discrimination processing mode.

In the confirmation processing mode, the job format processing unit 58 uses a threshold value for a font (here, a bitmap font) that is other than the basic font type and executes the similar comparison as described above. If the comparison result is within the range of the bitmap font-use threshold value of the respective units, the job format processing unit 58 judges to switch to a bitmap font and execute printing.

If the comparison result of any of the units is outside the range of the bitmap font-use threshold value (exceeds the threshold value) of the corresponding unit, the job format processing unit 58 employs the font type where, of differences resulting from the comparison with the bitmap font-use threshold value and differences resulting from the comparison with the outline font-use threshold value, the differences are few.

As shown in FIG. 4, the imposition processing unit 60 decides how the data that have been converted into an intermediate code by the filter processing of the job format processing unit 58 are to be placed (imposed) on recording paper. For example, the imposition processing unit 60 decides one-sided or two-sided printing on the recording paper and the number of pages allocated to one side.

The RIP processing and managing unit 62 receives the intermediate code that has been imposed by the imposition processing unit 60 and controls the decomposer processing unit 64 to convert the intermediate code into image data.

The decomposer processing unit 64 analyzes the intermediate code it has received from the RIP processing and managing unit 62 and performs drawing processing to generate data. Font imaging processing and rendering processing are also executed in this decomposer processing unit 64.

This decomposer processing unit 64 has the function of again executing the font determination that has been implemented in the job format processing unit 58 and storing the determination as history information. This history information is stored in character code units. If an identical character code is stored as history information at the time of the font type determination by the job format processing unit 58 in subsequent printing jobs, the font type determination by the job format processing unit 58 is omitted.

The action of the present exemplary embodiment will be described below.

Figure 5A:
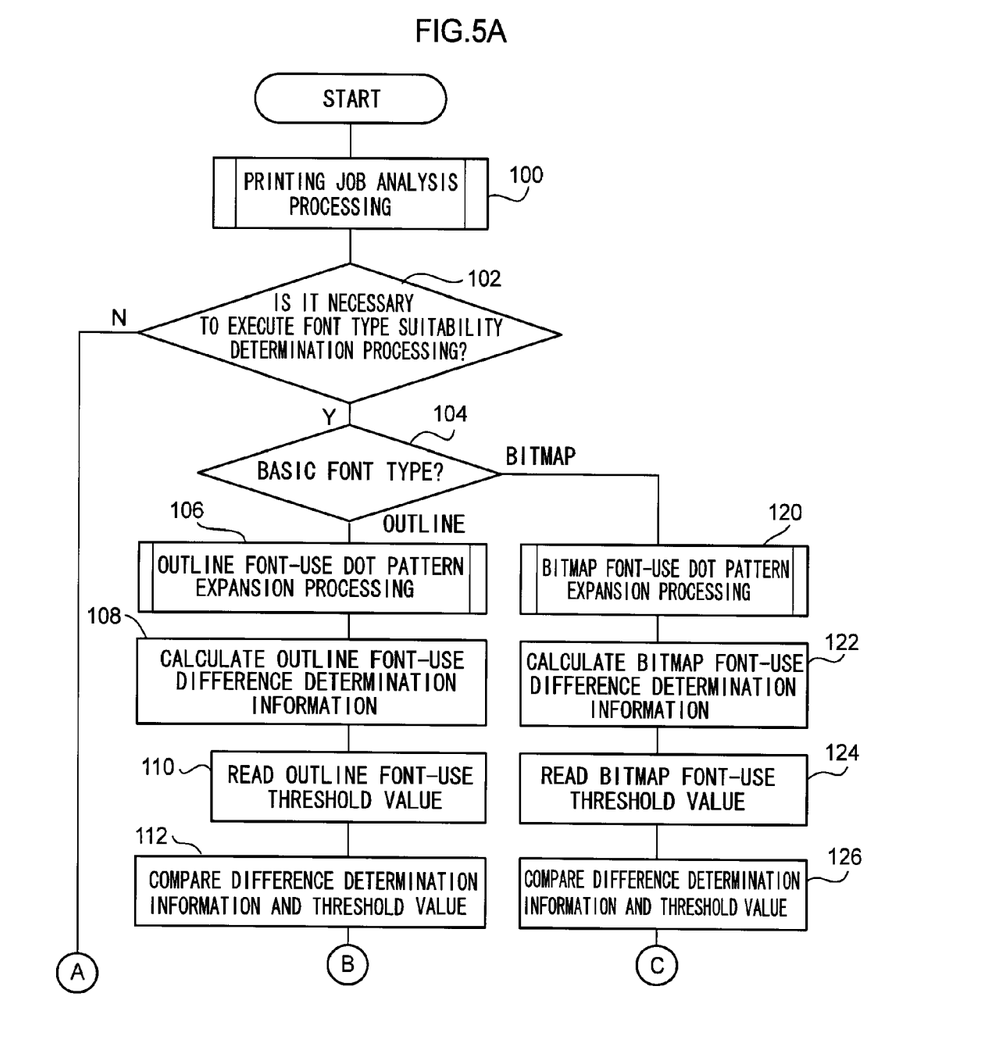
FIG. 5A and FIG. 5B are control flowcharts showing a flow of processing for font selection that imparts compatibility pertaining to the exemplary embodiment.
Figure 5B:
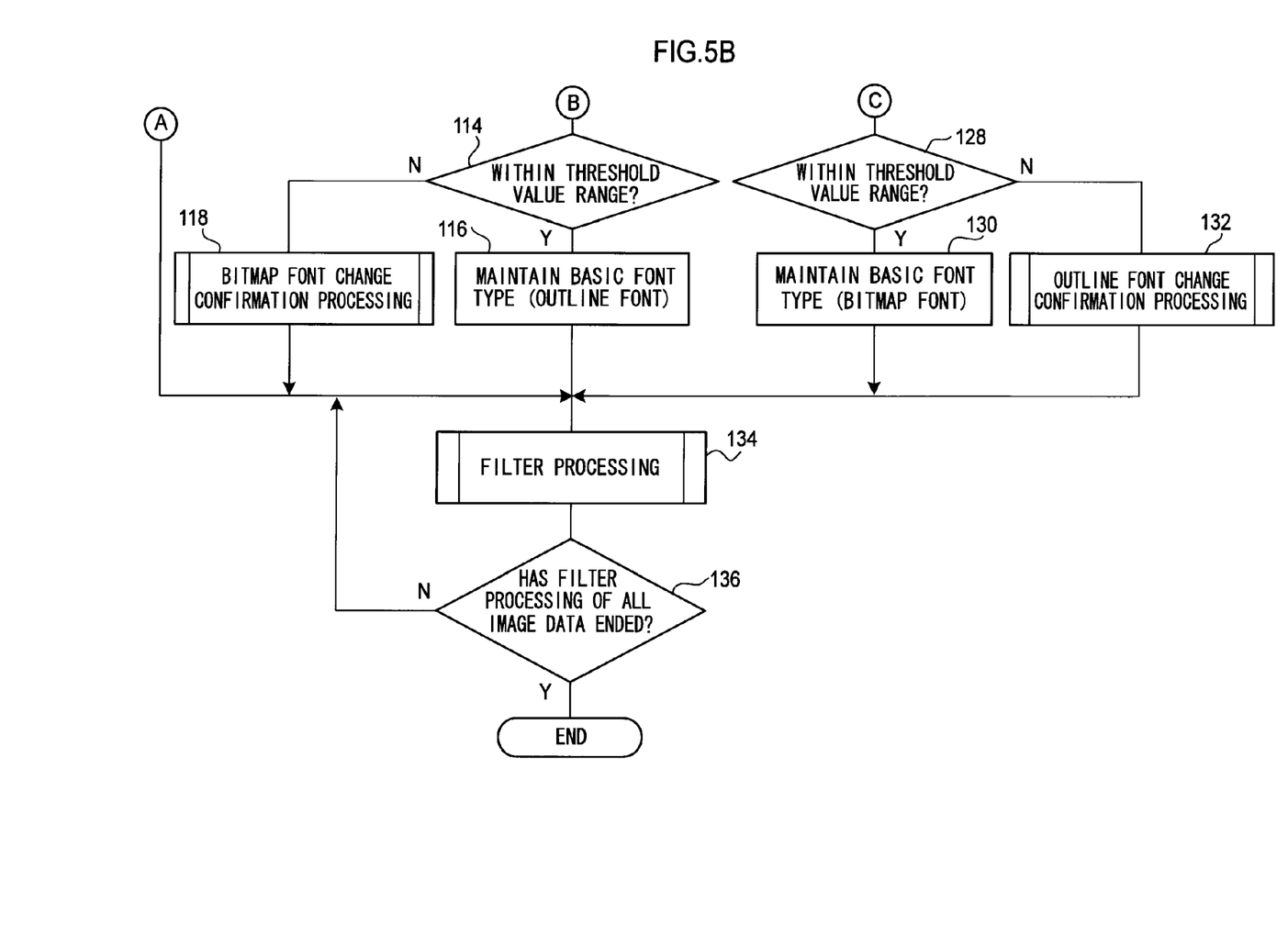

FIGS. 5A and 5B are control flowcharts showing a processing routine for performing the determination of whether to maintain or change the basic font type of the printing apparatus 12 when there is a font designation in the printing job.

In step 100, printing job analysis processing is performed. Then, the processing routine moves to step 102, where it determines whether or not it is necessary to execute the font type suitability determination processing on the basis of the designated font type and the scale information included in the printing job. If it is judged in step 102 that the determination processing is unnecessary, the processing routine moves to step 134.

If it is judged in step 102 that the determination processing is necessary, the processing routine moves to step 104, where it determines whether the basic font type of the printing apparatus 12 is an outline font or a bitmap font.

If the basic font type is an outline font in step 104, the processing routine moves to step 106, where it performs outline font-use dot pattern expansion processing. Then, the processing routine moves to step 108, where it calculates outline font-use difference determination information ΔOut. That is, the difference is calculated in dot units, byte units, and word units between the dot pattern that has been expanded by the printing apparatus 12 in the outline font that is the basic font type and the dot pattern in the designated font type (here, a bitmap font) that serves as the target.

In the next step 110, the outline font-use threshold value is read. Then, the processing routine moves to step 112, where it compares the difference determination information and the threshold value.

In the next step 114, it is judged as a result of the comparison in step 112 whether or not the difference is within the range of the threshold value. If the determination of step 114 is YES, the processing routine moves to step 116, where it maintains the basic font type—that is, the outline font. Then, the processing routine moves to step 134.

If the determination of step 114 is NO, the processing routine moves to step 118, where the confirmation processing for changing to a font type that is other than the basic font type—that is, to a bitmap font, in this exemplary embodiment—is executed. Thereafter, the processing routine moves to step 134.

On the other hand, if the basic font type is a bitmap font in step 104, the processing routine moves to step 120, where it performs bitmap font-use dot pattern expansion processing. Next, the processing routine moves to step 122, where it calculates bitmap font-use difference determination information ΔBit. That is, the difference is calculated in dot units, byte units, and word units between the dot pattern that has been expanded by the printing apparatus 12 in the bitmap font that is the basic font type and the dot pattern in the designated font type (here, a bitmap font) that serves as the target. Even when the font types are the same (here, bitmap fonts), sometimes, due to the specifications of the printing apparatus such as scale, resolution and etc., the dot pattern that has been expanded by the printing apparatus and the dot pattern that has been expanded by the designated font type are not identical and differences per dot arise.

In the next step 124, the bitmap font-use threshold value is read. Then, the processing routine moves to step 126, where it compares the difference determination information and the threshold value.

In the next step 128, it is judged as a result of the comparison in step 126 whether or not the difference is within the range of the threshold value. If the determination of step 128 is YES, the processing routine moves to step 130, where it maintains the basic font type—that is, the bitmap font in this exemplary embodiment. Then, the processing routine moves to step 134.

When the determination of step 128 is NO, the processing routine moves to step 132, where the confirmation processing for changing to a font type that is other than the basic font type—that is, to an outline font in this exemplary embodiment—is executed. Thereafter, the processing routine moves to step 134.

In step 134, the filter processing that is the inherent processing of the job format processing unit 58 is executed. In the next step 136, it is judged whether or not filter processing of all image information has ended. If the determination is NO, the processing routine returns to step 134 and repeats the filter processing. If the determination of step 136 is YES, this routine ends.

Figure 6:
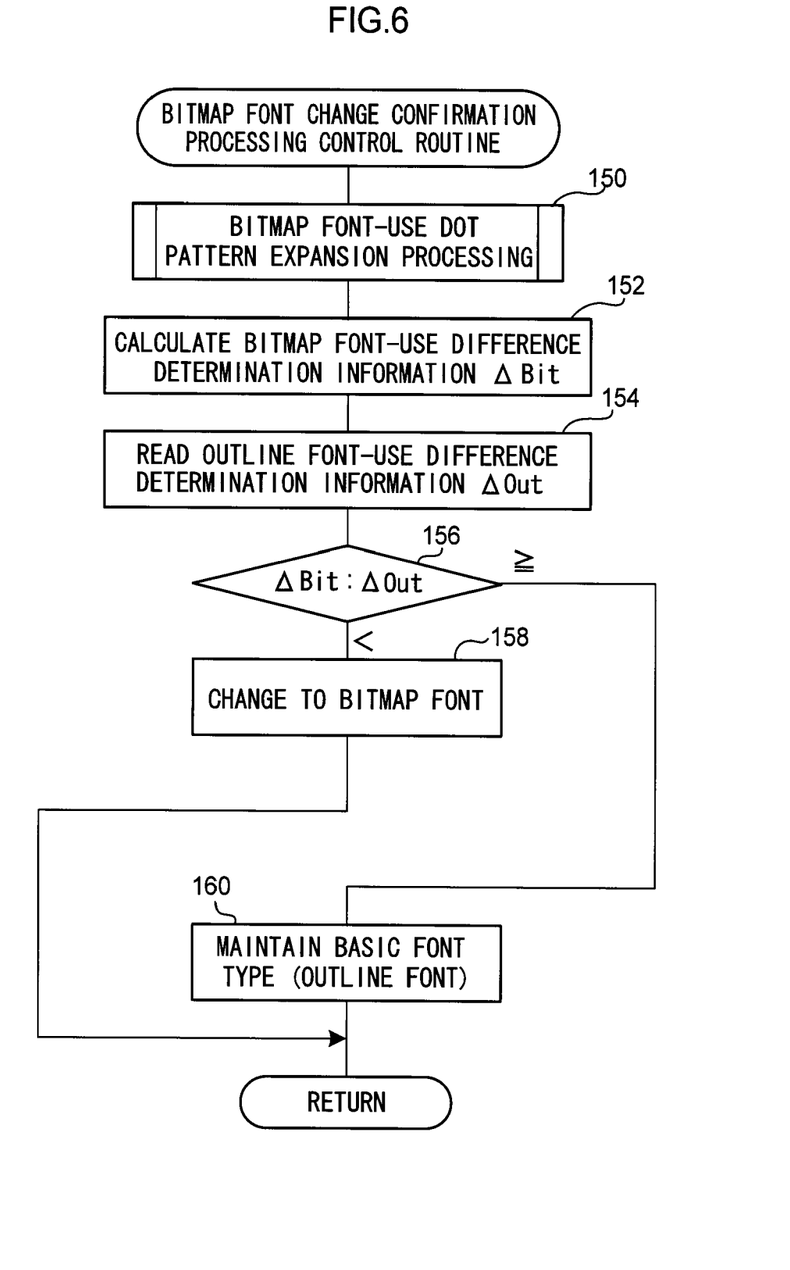
FIG. 6 is a control flowchart showing a bitmap font change confirmation processing routine shown in step 118 of FIG. 5B.

FIG. 6 shows the bitmap font change configuration processing routine in step 118 of FIG. 5.

In step 150, bitmap font-use dot pattern expansion processing is performed. Next, the processing routine moves to step 152, where it calculates bitmap font-use difference determination information ΔBit. That is, the difference is calculated in dot units, byte units, and word units between the dot pattern in the bitmap font that has been expanded by the printing apparatus 12 and the dot pattern in the designated font type (here, a bitmap font) that serves as the target.

In the next step 154, the outline font-use difference determination information ΔOut that has been obtained in step 108 of FIG. 5 is read. Then, the processing routine moves to step 156, where it compares the bitmap font-use difference determination information ΔBit and the outline font-use difference determination information ΔOut.

If ΔBit<ΔOut as a result of this determination, the processing routine moves to step 158, where it changes the font type from the basic font type (an outline font in this exemplary embodiment) to a bitmap font. Then, this routine ends.

If ΔBit≧ΔOut in step 156, the processing routine moves to step 160, where it maintains the basic font type (an outline font in this exemplary embodiment). Then, this routine ends.

Figure 7:
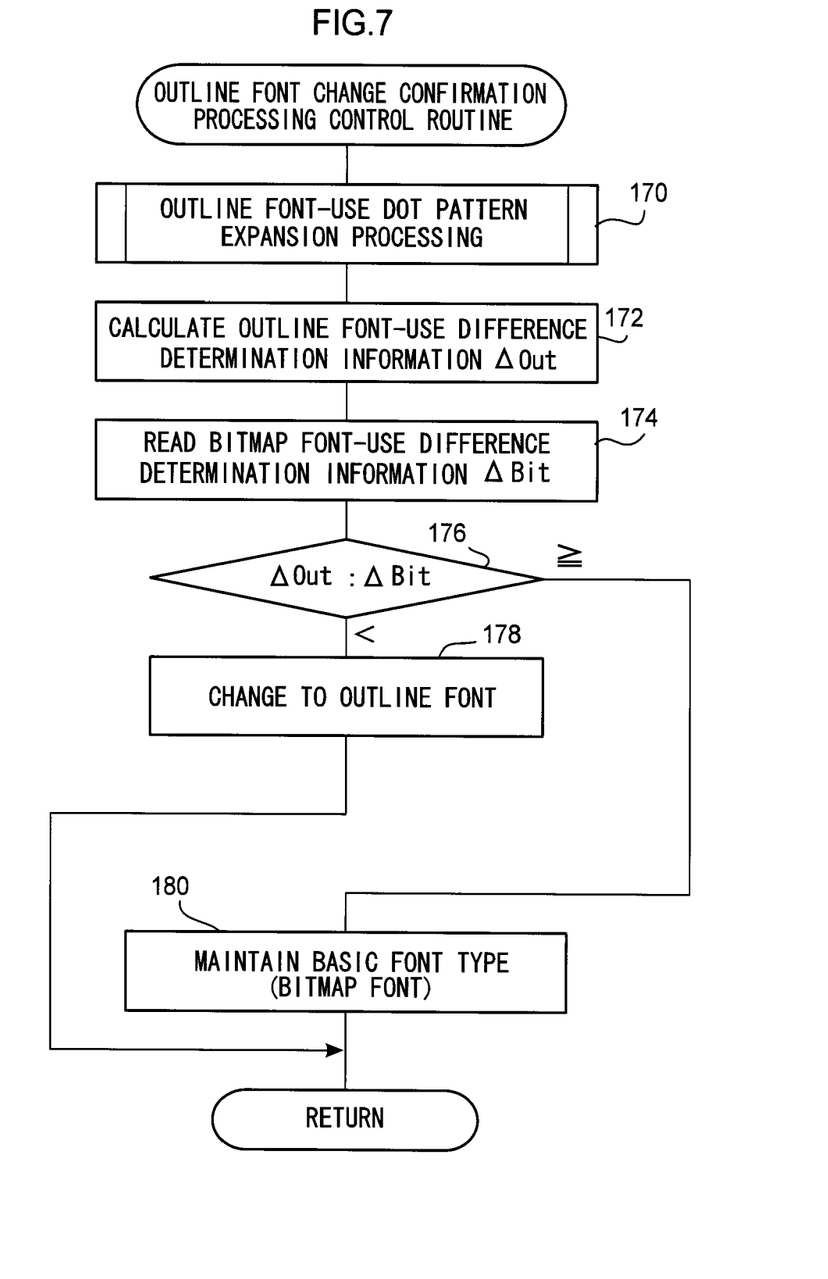
FIG. 7 is a control flowchart showing an outline font change confirmation processing routine shown in step 132 of FIG. 5B.

FIG. 7 shows the outline font change confirmation processing control routine in step 132 of FIG. 5.

In step 170, the processing routine performs outline font-use dot pattern expansion processing. Next, the processing routine moves to step 172, where it calculates outline font-use difference determination information ΔOut. That is, the difference is calculated in dot units, byte units, and word units between the dot pattern in the outline font that has been expanded by the printing apparatus 12 and the dot pattern in the designated font type (here, a bitmap font) that serves as the target.

In the next step 174, the bitmap font-use difference determination information ΔBit that has been obtained in step 122 of FIG. 5 is read. Then, the processing routine moves to step 176, where it compares the outline font-use difference determination information ΔOut and the bitmap font-use difference determination information ΔBit.

If ΔOut<ΔBit as a result of this determination, the processing routine moves to step 178, where it changes the font type from the basic font type (a bitmap font in this exemplary embodiment) to an outline font. Then, this routine ends.

If ΔOut≧ΔBit in step 176, the processing routine moves to step 180, where it maintains the basic font type (a bitmap font in this exemplary embodiment). Then, this routine ends.

As shown in FIG. 3, when the printing result of the printing apparatus 12(1) whose basic font type is a bitmap font and the printing result of the printing apparatus 12(2) whose font type has been changed to a backup font type (a bitmap font) (see (b) of the printing apparatus 12(2)) are compared, it will be understood that, even if there is an enlarge designation, differences disappear between the printed state in the printing apparatus 12(1) and the printed state in the printing apparatus 12(2) (see the enlarged size characters in FIG. 3).

In the present exemplary embodiment, compatibility between the old type and the new type of printing apparatus 12(1) and 12(2) resulting from differences in font type has been described. However, the similar is true in regard also to compatibility resulting from resolution, and the invention may also be configured such that, if the old type of printing apparatus 12(1) has a relatively low resolution and the new type of printing apparatus 12(2) has a relatively high resolution, it determines whether or not it is necessary to change the resolution by expanding and comparing dot patterns. The similar is true in regard also to compatibility resulting from font size, and the invention may also be configured such that it determines whether or not it is necessary to change the font size by expanding and comparing dot patterns. Moreover, the invention may also be configured to determine multiple compatibilities resulting from a combination of two or more of font type, resolution, and font size by comparing dot patterns.

In the present exemplary embodiment, control that selects the font type for imparting compatibility is configured to be performed by the main controller 16 of the printing apparatus 12, but it may also be performed by the host computer 10 or by a dedicated server disposed on the communication network 14.

The type and form of the printing apparatus 12 are not particularly limited, and the present exemplary embodiment may also be applied to so-called enterprise printing apparatus (mission-critical printing apparatus) intended for large-volume printing.

The foregoing description of the embodiments of the present invention has been provided for the purpose of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to be suited to the particular use contemplated. It is intended that the scope of the invention be defined by the following claims and their equivalents.

What is claimed is:

1. An image information processing device comprising:
a receiving unit that receives image information and instruction information including printing form information and scale information for printing on the basis of the image information in order to execute printing with a printing apparatus that is capable of applying at least plural differing printing forms and applies as a basic form any printing form of the plural differing printing forms to print an image;
a processing unit that executes processing that is necessary in order to print on the basis of the instruction information that is received by the receiving unit;
a sending unit that sends to the printing apparatus printing information after the execution of the processing by the processing unit;
an information acquiring unit that acquires printing form designation information and scale designation information that are instructed by the instruction information at the time of the processing in the processing unit;
an extracting unit that extracts, on the basis of the scale designation information that is acquired by the information acquiring unit, an object whose printing form is to be changed in code image units registered on the basis of identification codes beforehand;
a comparing unit that compares, with respect to the object that is extracted by the extracting unit, a dot pattern that is expanded on the basis of the printing form designation information that is acquired by the information acquiring unit and a dot pattern that is expanded on the basis of the basic form; and
a determining unit that determines, on the basis of the result of comparison by the comparing unit, whether or not to maintain a designated printing form based on the printing form designation information with respect to the extracted object.

2. The image information processing device according to claim 1, wherein the printing form includes at least one or more of two or more types of font types including at least bitmap fonts and outline fonts, two or more types of resolutions that relatively differ, or two or more types of font sizes that relatively differ.

3. The image information processing device according to claim 1, wherein the comparing unit compares a difference in dot units and in aggregate units of plural dots, and
the determining unit maintains the designated printing form if the difference that is obtained by the comparing unit is within a threshold value and executes redetermination processing if the difference that is obtained by the comparing unit exceeds the threshold value.

4. The image information processing device according to claim 3, wherein, in the redetermination processing, the determining unit compares a dot pattern that is expanded on the basis of the printing form designation information that is acquired by the information acquiring unit and a dot pattern that is expanded on the basis of a printing form that is other than the basic form and selects the printing form where dot differences are the fewest.

5. The image information processing device according to claim 1, wherein the comparison result of the comparing unit or the determination result of the determining unit in the code image units is stored as history information and the history information is subsequently applied with respect to code images in which the history information exists.

6. An image information processing device comprising:
a receiving unit that receives image information and instruction information including font type information and scale information for printing on the basis of the image information in order to execute printing with a printing apparatus that is capable of applying font types including at least bitmap fonts and outline fonts and applies as a basic font type any font to print an image;
a processing unit that executes processing that is necessary in order to print on the basis of the instruction information that is received by the receiving unit;
a sending unit that sends to the printing apparatus printing information after the execution of the processing by the processing unit;
an information acquiring unit that acquires font type designation information and scale designation information that are instructed by the instruction information at the time of the processing in the processing unit;
an extracting unit that extracts, on the basis of the scale designation information that is acquired by the information acquiring unit, an object whose font type is to be changed in code image units registered on the basis of identification codes beforehand;
a comparing unit that compares, with respect to the object that is extracted by the extracting unit, a dot pattern that is expanded on the basis of the font type designation information that is acquired by the information acquiring unit and a dot pattern that is expanded on the basis of the basic font type; and
a determining unit that determines, on the basis of the comparison result of the comparing unit, whether or not to maintain a designated font type based on the font type designation information with respect to the extracted object.

7. The image information processing device according to claim 6, wherein
the comparing unit compares a difference in dot units and in aggregate units of plural dots, and the determining unit maintains the designated font type if the difference that is obtained by the comparing unit is within a threshold value and executes redetermination processing if the difference that is obtained by the comparing unit exceeds the threshold value.

8. The image information processing device according to claim 7, wherein in the redetermination processing, the determining unit compares a dot pattern that is expanded on the basis of the font type designation information that is acquired by the information acquiring unit and a dot pattern that is expanded on the basis of a font type that is other than the basic font type and selects the font type where dot differences are the fewest.

9. The image information processing device according to claim 6, wherein the comparison result of the comparing unit or the determination result of the determining unit in the code image units is stored as history information and the history information is subsequently applied with respect to code images in which the history information exists.

10. A non-transitory computer-readable medium storing a program causing a computer to perform image information processing, the processing comprising:
receiving image information and instruction information including printing form information and scale information for printing on the basis of the image information in order to execute printing with a printing apparatus that is capable of applying at least plural differing printing forms and applies as a basic form any printing form of the plural differing printing forms to print an image;
executing processing that is necessary in order to print on the basis of the received instruction information;
sending to the printing apparatus printing information after the execution of the processing;
acquiring printing form designation information and scale designation information that are instructed by the instruction information at the time of the processing;
extracting, on the basis of the acquired scale designation information, an object whose printing form is to be changed in code image units registered on the basis of identification codes beforehand;
comparing, with respect to the extracted object, a dot pattern that is expanded on the basis of the acquired printing form designation information and a dot pattern that is expanded on the basis of the basic form; and
determining, on the basis of the comparison result, whether or not to maintain a designated printing form based on the printing form designation information with respect to the extracted object.

11. The non-transitory computer-readable medium according to claim 10, wherein the printing form includes at least one or more of two or more types of font types including at least bitmap fonts and outline fonts, two or more types of resolutions that relatively differ, or two or more types of font sizes that relatively differ.

12. The non-transitory computer-readable medium according to claim 10, wherein
comparing the dot patterns further includes comparing a difference in dot units and in aggregate units of plural dots, and
determining whether or not to maintain the designated font type further includes maintaining the designated printing form if the difference that is obtained by the comparison is within a threshold value and executing redetermination processing if the difference that is obtained by the comparison exceeds the threshold value.

13. The non-transitory computer-readable medium according to claim 12, wherein the redetermination processing includes comparing a dot pattern that is expanded on the basis of the acquired printing form designation information and a dot pattern that is expanded on the basis of a printing form that is other than the basic form and selecting the printing form where dot differences are the fewest.

14. The non-transitory computer-readable medium according to claim 10, wherein the processing further includes storing as history information the comparison result or the determination result in the code image units, and
applying the history information with respect to code images in which the history information exists.

15. A non-transitory computer-readable medium storing a program causing a computer to perform image information processing, the processing comprising:
receiving image information and instruction information including printing font type information and scale information for printing on the basis of the image information in order to execute printing with a printing apparatus that is capable of applying font types including at east bitmap fonts and outline fonts and applies as a basic font type any font to print an image;
executing processing that is necessary in order to print on the basis of the received instruction information;
sending to the printing apparatus printing information after the execution of the processing;
acquiring font type designation information and scale designation information that are instructed by the instruction information at the time of the processing;
extracting, on the basis of the acquired scale designation information, an object whose font type is to be changed in code image units registered on the basis of identification codes beforehand;
comparing, with respect to the extracted object, a dot pattern that is expanded on the basis of the acquired font type designation information and a dot pattern that is expanded on the basis of the basic font; and
determining, on the basis of the comparison result, whether or not to maintain a designated font type based on the font type designation information with respect to the extracted object.

16. The non-transitory computer-readable medium according to claim 15, wherein
comparing the dot patterns further includes comparing a difference in dot units and in aggregate units of plural dots, and
determining whether or not to maintain the designated font type further includes maintaining the designated font type if the difference that is obtained by the comparison is within a threshold value and executing redetermination processing if the difference that is obtained by the comparison exceeds the threshold value.

17. The non-transitory computer-readable medium according to claim 16, wherein the redetermination processing includes comparing a dot pattern that is expanded on the basis of the acquired font type designation information and a dot pattern that is expanded on the basis of a font type form that is other than the basic font and selecting the font type where dot differences are the fewest.

18. The non-transitory computer-readable medium according to claim 15, wherein the processing further includes
storing as history information the comparison result or the determination result in the code image units, and
applying the history information with respect to code images in which the history information exists.

19. An image information processing method comprising:
receiving image information and instruction information including printing form information and scale information for printing on the basis of the image information in order to execute printing with a printing apparatus that is capable of applying at least plural differing printing forms and applies as a basic form any printing form of the plural differing printing forms to print an image;

executing processing that is necessary in order to print on the basis of the received instruction information;

sending to the printing apparatus printing information after the execution of the processing;

acquiring printing form designation information and scale designation information that are instructed by the instruction information at the time of the processing;

extracting, on the basis of the acquired scale designation information, an object whose printing form is to be changed in code image units registered on the basis of identification codes beforehand;

comparing, with respect to the extracted object, a dot pattern that is expanded on the basis of the acquired printing form designation information and a dot pattern that is expanded on the basis of the basic form; and determining, on the basis of the comparison result, whether or not to maintain a designated printing form based on the printing form designation information with respect to the extracted object.

* * * * *